(12) United States Patent
Chivasa et al.

(10) Patent No.: US 11,266,149 B2
(45) Date of Patent: Mar. 8, 2022

(54) HERBICIDAL COMPOSITIONS

(71) Applicant: University of Durham, Durham (GB)

(72) Inventors: Stephen Chivasa, Durham (GB); Fidel González-Torralva, Cordova (ES)

(73) Assignee: UNIVERSITY OF DURHAM, Durham (GB)

( * ) Notice: Subject to any disclaimer, the term of this patent is extended or adjusted under 35 U.S.C. 154(b) by 40 days.

(21) Appl. No.: 16/342,185

(22) PCT Filed: Oct. 12, 2017

(86) PCT No.: PCT/GB2017/053082
§ 371 (c)(1),
(2) Date: Apr. 15, 2019

(87) PCT Pub. No.: WO2018/069709
PCT Pub. Date: Apr. 19, 2018

(65) Prior Publication Data
US 2019/0269137 A1   Sep. 5, 2019

(30) Foreign Application Priority Data
Oct. 14, 2016  (GB) ..................................... 1617420

(51) Int. Cl.
*A01N 57/20*  (2006.01)
(52) U.S. Cl.
CPC .................................. *A01N 57/20* (2013.01)
(58) Field of Classification Search
CPC ..... A01N 2300/00; A01N 57/20; A01N 63/00
See application file for complete search history.

(56) References Cited

U.S. PATENT DOCUMENTS

| 4,405,531 A | 9/1983 | Franz | |
| 6,566,587 B1* | 5/2003 | Lebrun | C12N 15/8275 800/300 |
| 2002/0155953 A1* | 10/2002 | Brigance | A01N 37/36 504/206 |
| 2004/0077608 A1 | 4/2004 | Abraham | |

FOREIGN PATENT DOCUMENTS

| WO | 2009033605 A2 | 3/2009 |
| WO | 2015094884 A1 | 6/2015 |

OTHER PUBLICATIONS

ISR/EP, "International Search Report for PCT/GB2017/053082", dated Nov. 23, 2017, p. 4, Publisher: International Searching Authority EP, Published in: European Patent Office.
ISA/EP, "Written Opinion for PCT/GB2017/053082", dated Nov. 23, 2017, p. 6, Publisher: International Search Authority European Office, Published in: Munich Germany.
ISA/GB, "International Search Report and Written Opinion for the corresponding PCT application #GB1617420.3 dated Apr. 11, 2017", pp. 1-3.
Amrhein et al., The Site of the Inhibition of the Shikimate Pathway by Glyphosate: II. Interference of Glyphosate with Chorismate Formation in vivo and in vitro, Plant Physiol, 1980, pp. 830-834, vol. 66.
Boocock et al., Kinetics of 5-enolpyruvylshikimate-3-phosphate synthase inhibition by glyphosate, FEBS Lett, 1983, pp. 127-133, vol. 154.
Cheng et al., Structural basis for shikimate-binding specificity of Helicobacter pylori shikimate kinase, J Bacteriol, 2005, pp. 8156-8163, vol. 187.
Fucile et al., Evolutionary diversification of plant shikimate kinase gene duplicates, PLoS Genet, 2008, p. e1000292, vol. 4.
Gaines et al., Gene amplification confers glyphosate resistance in Amaranth us palmeri, Proc Natl Acad Sci USA, 2010, pp. 1029-1034, vol. 107.
Gu et al., Crystal structure of shikimate kinase from *Mycobacterium tuberculosis* reveals the dynamic role of the LID domain in catalysis, J Mol Biol, 2002, pp. 779-789, vol. 319.
Herrmann, The Shikimate Pathway as an Entry to Aromatic Secondary Metabolism, Plant Physiol, 1995, pp. 7-12, vol. 107.
Kaundun et al., A novel P106L mutation in EPSPS and an unknown mechanism(s) act additively to confer resistance to glyphosate in a South African Lolium rigidum population, J Agric Food Chem, 2011, pp. 3227-3233, vol. 59.
Kaundun et al., A simple in-season bioassay for detecting glyphosate resistance in grass and broadleaf weeds prior to herbicide application in the field, Weed Science, 2014, pp. 597-607.
Leipe et al., Evolution and classification of P-loop kinases and related proteins, J Mol Biol, 2003, pp. 781-815, vol. 333.
Lorraine-Colwill et al., Investigations into the mechanism of glyphosate resistance in Lolium rigidum, Pestic Biochem Physiol, 20023, pp. 62-72, vol. 74.
Ng et al., Glyphosate resistance in *Eleusine indica* (L.) Gaertn. from different origins and polymerase chain reaction amplification of specific alleles, Aust J Agric Res, 2004, pp. 407-414, vol. 55.
Sharkhuu et al., A red and far-red light receptor mutation confers resistance to the herbicide glyphosate. Plant J, 2014, pp. 916-926, vol. 78.
Steinrucken et al., The herbicide glyphosate is a potent inhibitor of 5-enolpyruvyl-shikimic acid-3-phosphate synthase. Biochem Biophys Res Commun, 1980, pp. 1207-1212, vol. 94.

(Continued)

*Primary Examiner* — Johann R Richter
*Assistant Examiner* — Danielle Sullivan
(74) *Attorney, Agent, or Firm* — Wolter Van Dyke Davis, PLLC; Martha Cassidy; Eugene J. Molinelli (57) ABSTRACT

The present invention relates to herbicidal compositions which comprise glyphosate or related compounds together with a further agent which is designed to enhance the effects of glyphosate or related compounds and/or reduce the amount of glyphosate or related compounds which is required for herbicidal effect. There is also provided a method of treating plants with a herbicidal composition according to the present invention.

11 Claims, 6 Drawing Sheets
Specification includes a Sequence Listing.

(56) References Cited

OTHER PUBLICATIONS

Teaster et al., Varying tolerance to glyphosate in a population of Palmer amaranth with low EPSPS gene copy number. American J Plant Sci, 2013, pp. 2400-2408, vol. 4.

Tokhver et al., Light-dependence of the inhibiting action of glyphosate on the shikimate pathway in cotyledon leaves of buckwheat seedlings, Soviet Plant Physiol, 1987, pp. 748-753, vol. 33.

Weaver et al., Dynamics of the shikimate pathway in plants, Trends Plant Sci., 1997, pp. 346-351, vol. 2.

Yu et al., Evolution of a double amino acid substitution in the 5-enolpyruvylshikimate-3-phosphate synthase in Eleusine indica conferring high-level glyphosate resistance, Plant Physiol, 2015, pp. 1440-1447, vol. 167.

* cited by examiner

SEQUENCE LISTING

```
<160> NUMBER OF SEQ ID NOS: 28

<210> SEQ ID NO 1
<211> LENGTH: 21
<212> TYPE: DNA
<213> ORGANISM: Arabidopsis thaliana

<400> SEQUENCE: 1
gtggtcgtac aaccggtatt g                                          21

<210> SEQ ID NO 2
<211> LENGTH: 20
<212> TYPE: DNA
<213> ORGANISM: Arabidopsis thaliana

<400> SEQUENCE: 2
tcacgtccag caaggtcaag                                            20
```

```
<210> SEQ ID NO 3
<211> LENGTH: 22
<212> TYPE: DNA
<213> ORGANISM: Arabidopsis thaliana

<400> SEQUENCE: 3
atgagaggat gctctgcctt cg                                            22

<210> SEQ ID NO 4
<211> LENGTH: 21
<212> TYPE: DNA
<213> ORGANISM: Arabidopsis thaliana

<400> SEQUENCE: 4
gcagagcaaa cacagcaaca g                                             21

<210> SEQ ID NO 5
<211> LENGTH: 20
<212> TYPE: DNA
<213> ORGANISM: Arabidopsis thaliana

<400> SEQUENCE: 5
accaccgtca accaaacttc                                               20

<210> SEQ ID NO 6
<211> LENGTH: 20
<212> TYPE: DNA
<213> ORGANISM: Arabidopsis thaliana

<400> SEQUENCE: 6
tgaagcagct ggtgtttttg                                               20

<210> SEQ ID NO 7
<211> LENGTH: 21
<212> TYPE: DNA
<213> ORGANISM: Arabidopsis thaliana

<400> SEQUENCE: 7
tccagagtca gagaaaatct g                                             21

<210> SEQ ID NO 8
<211> LENGTH: 20
<212> TYPE: DNA
<213> ORGANISM: Arabidopsis thaliana

<400> SEQUENCE: 8
gcttggacgg tgagaaagat                                               20

<210> SEQ ID NO 9
<211> LENGTH: 19
<212> TYPE: DNA
<213> ORGANISM: Arabidopsis thaliana

<400> SEQUENCE: 9
ggagtctaga gaacaagaa                                                19

<210> SEQ ID NO 10
<211> LENGTH: 22
<212> TYPE: DNA
<213> ORGANISM: Arabidopsis thaliana

<400> SEQUENCE: 10
caagctcatt taacttggca ac                                            22
```

<210> SEQ ID NO 11
<211> LENGTH: 20
<212> TYPE: DNA
<213> ORGANISM: Arabidopsis thaliana

<400> SEQUENCE: 11
gcctttattg ctccaccaac                                                    20

<210> SEQ ID NO 12
<211> LENGTH: 20
<212> TYPE: DNA
<213> ORGANISM: Arabidopsis thaliana

<400> SEQUENCE: 12
cctggaaaga gtcgtggaag                                                    20

<210> SEQ ID NO 13
<211> LENGTH: 21
<212> TYPE: DNA
<213> ORGANISM: Arabidopsis thaliana

<400> SEQUENCE: 13
tttttgtttg gaagcttgga g                                                  21

<210> SEQ ID NO 14
<211> LENGTH: 22
<212> TYPE: DNA
<213> ORGANISM: Arabidopsis thaliana

<400> SEQUENCE: 14
ttttcaaaaa ttgacaagat cg                                                 22

<210> SEQ ID NO 15
<211> LENGTH: 23
<212> TYPE: DNA
<213> ORGANISM: Arabidopsis thaliana

<400> SEQUENCE: 15
ctccatttga tgaagaacaa cag                                                23

<210> SEQ ID NO 16
<211> LENGTH: 22
<212> TYPE: DNA
<213> ORGANISM: Arabidopsis thaliana

<400> SEQUENCE: 16
cgcattcacg aggaaactgt tc                                                 22

<210> SEQ ID NO 17
<211> LENGTH: 24
<212> TYPE: DNA
<213> ORGANISM: Arabidopsis thaliana

<400> SEQUENCE: 17
gagatcttct ctgcgtctgc ttct                                               24

<210> SEQ ID NO 18
<211> LENGTH: 21
<212> TYPE: DNA
<213> ORGANISM: Arabidopsis thaliana

<400> SEQUENCE: 18

-continued ttgcagagag tagttcgagc t                                       21

<210> SEQ ID NO 19
<211> LENGTH: 26
<212> TYPE: DNA
<213> ORGANISM: Arabidopsis thaliana

<400> SEQUENCE: 19
cttctggttt ggctataatc ttcaac                                  26

<210> SEQ ID NO 20
<211> LENGTH: 20
<212> TYPE: DNA
<213> ORGANISM: Arabidopsis thaliana

<400> SEQUENCE: 20
atccactgaa aacgcgagga                                         20

<210> SEQ ID NO 21
<211> LENGTH: 20
<212> TYPE: DNA
<213> ORGANISM: Arabidopsis thaliana

<400> SEQUENCE: 21
tcctgattac aaaccgggaa                                         20

<210> SEQ ID NO 22
<211> LENGTH: 21
<212> TYPE: DNA
<213> ORGANISM: Arabidopsis thaliana

<400> SEQUENCE: 22
cttcctcgga agctctcttc t                                       21

<210> SEQ ID NO 23
<211> LENGTH: 20
<212> TYPE: DNA
<213> ORGANISM: Arabidopsis thaliana

<400> SEQUENCE: 23
tgataactcc gcccaaaaag                                         20

<210> SEQ ID NO 24
<211> LENGTH: 20
<212> TYPE: DNA
<213> ORGANISM: Arabidopsis thaliana

<400> SEQUENCE: 24
cagcacaagc tgcaagagag                                         20

<210> SEQ ID NO 25
<211> LENGTH: 20
<212> TYPE: DNA
<213> ORGANISM: Arabidopsis thaliana

<400> SEQUENCE: 25
gtgcctcgga tgagagagag                                         20

<210> SEQ ID NO 26
<211> LENGTH: 20
<212> TYPE: DNA
<213> ORGANISM: Arabidopsis thaliana

<400> SEQUENCE: 26

```
ttagcgttga cacgaacagg                                              20

<210> SEQ ID NO 27
<211> LENGTH: 21
<212> TYPE: DNA
<213> ORGANISM: Arabidopsis thaliana

<400> SEQUENCE: 27
tggtggctct agttcttgtg g                                            21

<210> SEQ ID NO 28
<211> LENGTH: 20
<212> TYPE: DNA
<213> ORGANISM: Arabidopsis thaliana

<400> SEQUENCE: 28
ggctgctcta tctggagagg                                              20
```

HERBICIDAL COMPOSITIONS

CROSS-REFERENCE TO RELATED APPLICATIONS

This application is a 371 national stage application of PCT Application No. PCT/GB2017/053082, filed Oct. 12, 2017, and claims the benefit of United Kingdom Application No. 1617420.3, filed on Oct. 14, 2016; the entire contents of which are hereby incorporated by reference as if fully set forth herein, under 35 U.S.C. § 119(e).

REFERENCE TO SEQUENCE LISTING SUBMITTED VIA EFS-WEB

This application includes an electronically submitted sequence listing in .txt format. The .txt file contains a sequence listing entitled "PE957961US_ST25.txt" created on Mar. 13, 2019 and is 5 kilobytes in size. The sequence listing contained in this .txt file is part of the specification and is hereby incorporated by reference herein in its entirety.

FIELD OF THE INVENTION

The present invention relates to herbicidal compositions which comprise glyphosate or related compounds together with a further agent which is designed to enhance the effects of glyphosate or related compounds and/or reduce the amount of glyphosate or related compounds which is required for herbicidal effect. There is also provided a method of treating plants with a herbicidal composition according to the present invention.

BACKGROUND TO THE INVENTION

Glyphosate (N-[phosphonomethyl] glycine) made its commercial debut on the agrochemicals market in 1974 (Waltz, 2010) for use as a broad-spectrum non-selective pre-planting burndown herbicide or for targeted application in crops (Owen and Zelaya 2005). The introduction of glyphosate-resistant crops in 1996 entrenched its market dominance as the best-selling herbicide (Waltz, 2010) and global sales are projected to hit USD8.79 billion by 2019 (Transparency Market Research, 2014). Since expiration of Monsanto's glyphosate patent in 2000, major global agrochemical companies are manufacturing various formulations of glyphosate, with a global output recorded at 718.6 kilo tonnes in 2012 (Transparency Market Research, 2014). However, the market success of glyphosate is now threatened by the emergence of glyphosate-resistant weeds (Waltz, 2010; Heap, 2015).

Figure 1:
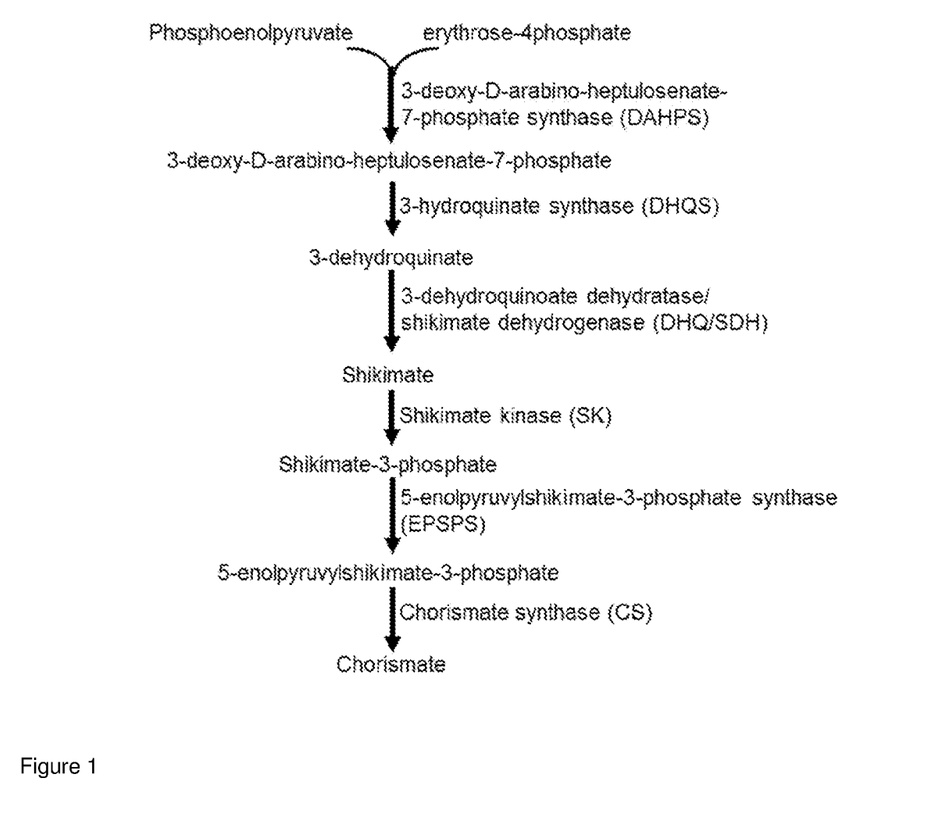
FIG. 1. shows a schematic representation of the shikimate pathway of plants.

Glyphosate is a potent inhibitor of the shikimate pathway, competitively binding to and inhibiting 5-enolpyruvyl-shikimate-3-phosphate synthase (EPSPS) (EC 2.5.1.19) (Steinrücken and Amrhein, 1980). Phosphoenolpyruvate and shikimate-3-phosphate are converted to 5-enoylpyruvyl-shikimate-3-phosphate in a reaction catalysed by EPSPS. The shikimate pathway is an important primary metabolic pathway whose terminal product chorismate is the major intermediate branch point metabolite serving as a precursor for synthesis of aromatic amino acids (tyrosine, tryptophan, phenylalanine) and various secondary metabolites, including quinones and indoles. Phenylalanine enters the phenylpropanoid pathway for synthesis of further secondary metabolites, such as flavonoids and lignins. The shikimate pathway is inaugurated by the condensation reaction of phosphoenolpyruvate and erythrose 4-phosphate, which are derived from glycolysis and the pentose phosphate pathway, respectively (FIG. 1). It is suspected that deprivation of aromatic amino acids is central to glyphosate phytotoxicity.

The commercial success of glyphosate, which had been fuelled by excessive use and overreliance on this single herbicide in agricultural applications, has inevitably led to the development of resistance now recorded in over 32 weed species (Heap, 2015). The known resistance mechanisms (reviewed in Sammons and Gaines, 2014) include mutation of key residues in the EPSPS enzyme (Kaundum et al., 2011; Ng et al., 2004; Yu et al., 2015), EPSPS gene amplification (Gaines et al., 2010), and altered glyphosate translocation (Lorraine-Colwill et al., 2002; Ge et al., 2010). The industry is responding by stacking genes for resistance to multiple herbicides in a single crop in order to control weeds using more than one herbicide in the same crop per season (Nature Editorial, 2014). For example, Monsanto have released soybean with glyphosate/dicamba resistance, Dow Agrosciences have cotton with glyphosate/2,4-D resistance, and Bayer have cotton with glyphosate/glufosinate resistance (Waltz, 2010). Of necessity, multiple herbicides also need to be used for non-agricultural applications, leading to an eventual erosion of the market dominance of glyphosate. However, in addition to sensible use of multiple herbicides for curbing the emergence of herbicide resistant weeds, a greater understanding of how herbicides actually work might provide new opportunities to counter this resistance.

SUMMARY OF THE INVENTION

The present invention is based on studies carried out by the inventors into the molecular responses to glyphosate. The obtained data enables: (i) a reduction of the amount of active ingredient used in glyphosate formulations and/or (ii) control glyphosate-resistant weeds.

In a first aspect there is provided a herbicidal composition or a combination comprising glyphosate or a suitable salt or salts thereof and at least one metabolite or metabolites of the shikimate pathway or upstream pathways, such as the pentose phosphate and/or glycolysis pathways.

In one embodiment the metabolite(s) of the shikimate pathway is found up-stream of where 5-enolpyruvylshikimate 3-phosphate synthase (EPSP synthase) acts (see FIG. 1) and is, for example, shikimate 3-phosphate, shikimate, 3-dehydroquinate, 3-deoxy-D-arabino-heptulosonate 7-phosphate (DAHP) from the shikimate pathway or gluconate kinase from the pentose phosphate pathway. In one embodiment the metabolite is shikimate 3-phosphate.

The shikimate pathway (or upstream pathway) metabolites may be obtained from a variety of sources. It is possible to synthesise the metabolites chemically; extract them from plant sources; over express the genes and/or pathway in microorganisms and isolate the metabolites; and obtain the metabolites by enzymic conversion of chemical precursors.

The herbicidal compositions of the present invention may be used to control unwanted plants or weeds. The herbicidal compositions may be selective in terms of controlling unwanted plants or weeds, whilst not harming a desired crop plant. The crop plant may be naturally resistant to the herbicidal composition or may be genetically engineered so as to be resistant to the herbicidal composition. Crop plants genetically transformed or selected to tolerate glyphosate include those whose seeds are sold by Monsanto Company or under license from Monsanto Company bearing the Roundup Ready® trademark. These include varieties of wheat, turfgrass, and corn. Other glyphosate resistant crops have been developed by Pioneer and Bayer Crop science, for example.

Glyphosate (N-phosphonomethylglycine) is well known in the art and is a widely used herbicide for post-emergence, nonselective weed control. Most herbicides, including glyphosate, are applied in a water carrier, such as by a spray mixture. To be effective, the herbicidal composition, typically as a spray mixture must be retained on a weed leaf surface; the herbicide active ingredient must be absorbed by the plant; and the herbicide must be translocated to the site of action.

Glyphosate competitively blocks the shikimate pathway, by binding EPSP synthase, which is common to virtually all plants, but which is absent in animals. Although glyphosate is very effective in killing or controlling the growth of unwanted plants, the uptake (i.e., absorption) of glyphosate by the plant foliar tissue and translocation of glyphosate throughout the plant is relatively slow. Visual symptoms that a plant has been treated with glyphosate may not appear until one week or more after treatment.

Glyphosate is relatively insoluble in water (1.16% by weight at 25° C.). For this reason it is typically formulated as a water-soluble salt. Glyphosate potassium salt has a molecular weight of 207. This salt is disclosed, for example, by Franz in U.S. Pat. No. 4,405,531, as one of the "alkali metal" salts of glyphosate useful as herbicides, with potassium being specifically disclosed as one of the alkali metals, along with lithium, sodium, cesium and rubidium. In addition to the "alkali metal" salts of glyphosate, other agriculturally acceptable salts include the isopropylamine, di-ammonium, ammonium, monoethanolamine, n-propylamine, methylamine, ethylamine, hexamethylenediamine, dimethylamine or trimethylsulfonium salts.

Single salt forms of glyphosate or mixtures of salt forms may be provided in accordance with the present invention. Suitable salt forms of glyphosate are as identified above. When two or more salt forms are provided, the various salts should be chosen so as not to adversely affect the viscosity, cloud point, non-crystallization and/or other stability properties of the composition.

The herbicidal compositions prepared according to the present invention are highly effective as a herbicide composition against a variety of weeds. The compositions of the present invention can be used as is or combined with other components including other agriculturally acceptable additives commonly used in formulated agricultural products, such as antifoam agents, compatibilizing agents, sequestering agents, neutralizing agents and buffers, corrosion inhibitors, dyes, odorants, penetration aids, wetting agents, spreading agents, drift control agents, dispersing agents, thickening agents, freeze point depressants, antimicrobial agents, crop oil, other biologically and/or agriculturally active components and the like. The concentrated agricultural compositions are typically diluted in water and then applied by conventional means well known to those in the art.

The formulations of the present invention may further comprise an adjuvant, such as a surfactant and/or ammonium sulfate. This may be included directly in the formulation and/or added prior to application. Even if present in the formulation, additional surfactant and/or ammonium sulfate often are recommended. In practice, the additional surfactant and/or ammonium sulfate and herbicide are added separately to the sprayer tank during spray mixture preparation.

It is well known that ammonium sulphate acts synergistically on the biological effect of glyphosate. For instance the patent literature contains many examples of combinations of glyphosate and ammonium sulphate, and in practice the farmer usually adds supplementary ammonium sulphate when diluting the glyphosate for use. Ammonium sulphate may be added in an amount of 4-8 kg per 400-500 L of tank mix Convenient surfactants include cationic surfactants, anionic surfactants, non-ionic surfactants, ionic surfactants, and amphoteric surfactants. According to the invention, the surfactant can be any surfactant or combination of two or more surfactants useful to facilitate dissolution of the herbicide compounds within the formulation.

Examples of some preferred surfactants include cationic, non-ionic, and anionic surfactants. Of these, some even more specific types of preferred surfactants include non-ionic linear or branched alcohol ethoxylate surfactants, anionic phosphoric acid ester surfactants (sometimes referred to as "phosphate ester" surfactants), and cationic ethoxylated tallow amine surfactants. Additional surfactants may be selected from the group consisting of secondary or tertiary amines, dialkoxylated quaternary ammonium salts, monoalkoxylated quaternary ammonium salts, quaternary ammonium salts, ether amines, amine oxides, dialkoxylated amines, aminated alkoxylated alcohols, alkyl alkoxylated phosphates and alkylpolyglycosides. Further details of surfactants are disclosed in US20060019828 to which the skilled reader is directed and the entire contents of which are hereby incorporated by way of reference.

An adjuvant may be used as a tank mixture, where the adjuvant is added to a sprayer tank as a separate product along with water and herbicide composition. The amount of adjuvant added to the sprayer tank may be adjusted independent of the herbicide rate to take into account water hardness, weed species, spray volume, and environmental conditions for example. Alternatively, the adjuvant may be mixed with the herbicidal composition to form a complete herbicide-adjuvant composition.

In another aspect, the present invention provides a method for controlling weeds and/or undesirable vegetation by applying a post-emergence herbicidal spray composition or tank mixture according to the present invention to weeds and/or other undesired vegetation. The herbicidal spray composition or tank mixture may be applied to weed populations which are sensitive to glyphosate such that less glyphosate may be required, or to weed populations which have developed a resistance to glyphosate, whereby such weeds which are resistant to glyphosate alone, become sensitive to glyphosate or sensitive to lower concentrations of glyphosate as applied alone.

There is also provided use of a mixture or combination of glyphosate or a suitable salt or salts thereof and a metabolite of the shikimate pathway, or upstream pathway as hereinbefore described, for controlling weeds and/or undesirable vegetation.

Typically the compositions, tank mix and/or mixtures of the present invention are to be applied post-emergence, that is after the weeds and/or undesirable vegetation have emerged from the ground and leaves are visible.

A tank-mixture composition comprises water as a spray vehicle, in an amount suitable for application to a plant and/or soil surface by spraying, more particularly in an amount suitable for delivery of the herbicide compositions to, for example weeds, that are to be killed or controlled.

The herbicidal compositions of the present invention may further comprise one or more additional herbicides, such as 2,4-dichlorophenoxyacetic acid (2,4-D), 4-(2,4-dichlorophenoxy)butanoic acid (2,4-DB), dichloroprop, (4-chloro-2-methylphenoxy)acetic acid (MCPA), 4-(4-chloro-2-methylphenoxy)butanoic acid (MCPB), mecoprop, dicamba, picloram, quinclorac, agriculturally acceptable salts or esters of any of these herbicides, and mixtures thereof.

In another aspect of the present invention, the herbicide compositions of the invention may include glyphosate at 5 g ae./L (grams acid equivalent per liter) to 600 g glyphosate ae./L, preferably from 65 to about 600, from about 75 to about 600, from about 100 to about 600, from about 150 to about 600, from about 200 to about 600, from about 250 to about 600, glyphosate g ae./L.

Typically prior to administration the herbicide composition may be in a concentrated form which require dilution prior to application. In concentrated form the herbicide compositions of the invention may include glyphosate at about 100 to about 600, from about 150 to about 600, from about 200 to about 600, from about 250 to about 600, glyphosate g ae./L. A common concentration of glyphosate is 360 g ae/L, but higher concentrations, such as 450, 480, 500 and 540 g ae/L are also available. Prior to use the herbicide composition may be diluted such that the glyphosate may be applied in a more diluted form.

Typically the molar ratio of glyphosate to shikimate pathway, or upstream pathway metabolite, such as shikimate 3-phospate is about 1:7.5-1:100, such as 1:8-1:75, or 1:10-1:50.

When an additional herbicide is present, the weight ratio of glyphosate to additional herbicide is about 10:1 to about 200:1, about 20:1 to about 200:1; more preferably, about 40:1 to about 100:1; particularly, about 50:1 to about 100:1.

The selection of application rates that are herbicidally effective for a composition of the invention is within the skill of the ordinary agricultural scientist. Those of skill in the art will likewise recognize that individual plant conditions, weather and growing conditions, as well as the specific active ingredients and their weight ratio in the composition, will influence the degree of herbicidal effectiveness achieved in practicing this invention. Typical application rates of the herbicide compositions of the present invention can be determined. A person skilled in the art would understand that when the weed growth is heavy or dense or where weeds are growing in an undisturbed area, a higher application rate may be necessary to achieve acceptable weed control. In addition, for difficult-to-control weeds, a higher application rate may be necessary for adequate weed control.

The present inventors have observed that inclusion of a shikimate pathway metabolite, such as shikimic acid permits a reduction in the amount of glyphosate which may be required to be effective. Depending on the weeds to be treated it may be possible to employ at least 10%, 15%, 25%, 50%, 60% or more, less glyphosate than would be required to control the weeds in the absence of the shikimate pathway (or upstream pathway) metabolite, such as shikimic acid (or its anionic form shikimate), or shikimate-3-phosphate A plant treatment composition is preferably dilute enough to be readily sprayed using standard agricultural spray equipment. Amounts of water are usually expressed in terms of "spray volume", i. e., the volume of spray solution (which is mostly water, making up the balance after accounting for the herbicide compositions and other optional additives as described herein) to be applied to a unit land area. Spray volume can be expressed in any suitable units such as liters/hectare (l/ha) or gallons/acre. Most commonly, spray volumes useful for tank-mix compositions of the present invention will be selected in a range of about 10 to about 1,000 l/ha, for example about 25 to about 500 l/ha.

Desirably the herbicidal compositions of the present invention are storage stable. By "storage-stable," in the context of the present invention, is meant not exhibiting phase separation on exposure to temperatures up to about 50° C., and preferably not forming crystals of glyphosate or salt thereof on exposure to a temperature of about 0° C. for a period of up to about 7 days (i.e., the composition must have a crystallization point of 0° C. or lower). For aqueous solution concentrates, high temperature storage stability is often indicated by a cloud point of about 50° C. or more. Cloud point of a composition is normally determined by heating the composition until the solution becomes cloudy and then allowing the composition to cool, with agitation, while its temperature is continuously monitored. A temperature reading taken when the solution clears is a measure of cloud point. A cloud point of 50° C. or more is normally considered acceptable for most commercial purposes for a glyphosate SL formulation. Ideally the cloud point should be 60° C. or more, and the composition should withstand temperatures as low as about −10° C., preferably as low as about −20° C., more preferably as low as about −30° C., for up to about 7 days without phase separation (i.e., without separation of frozen water or solid insoluble surfactant or other components from the composition) and without crystal growth (even in the presence of seed crystals of the glyphosate salt).

DETAILED DESCRIPTION

The present invention will now be further described by way of example and with reference to the figures which show.

The shikimate pathway draws metabolites from glycolysis and the pentose-phosphate pathways, resulting in chorismate production, which feeds into amino acid and secondary metabolite biosynthesis.

Figure 2:
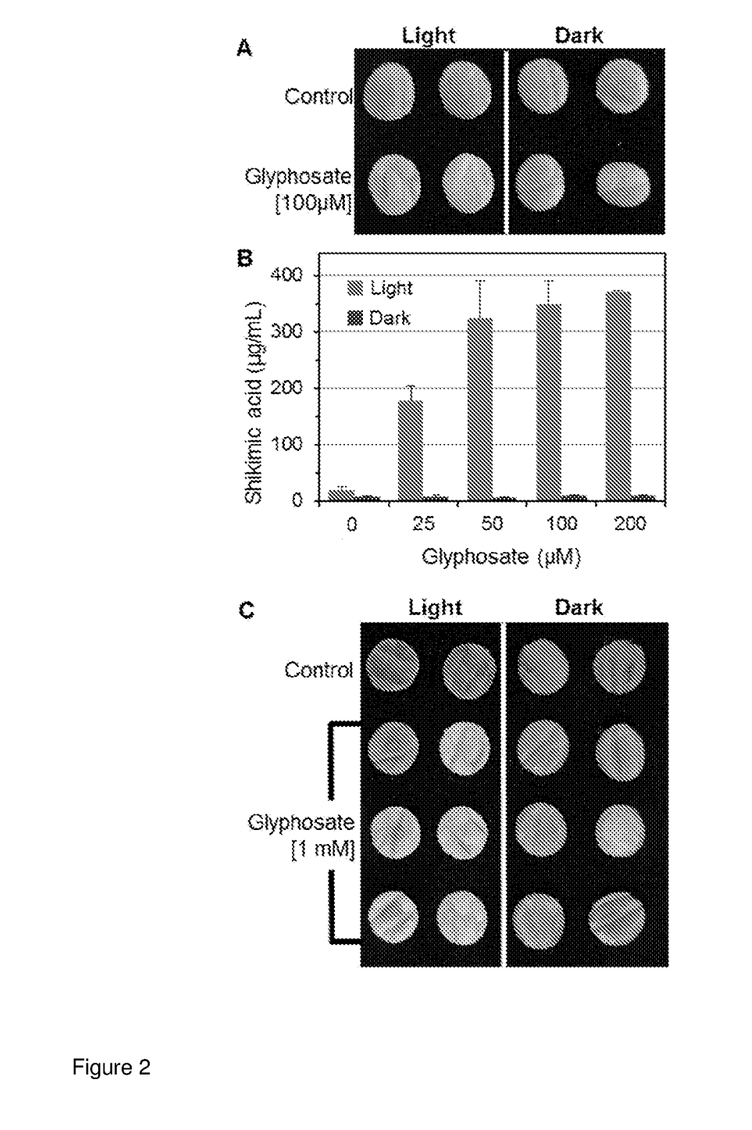
FIG. 2. shows glyphosate toxicity and shikimate accumulation requires light.

*Conyza sumatrensis* leaf discs were floated on water (serving as control) or indicated concentrations of glyphosate. The discs were incubated in the light or darkness. (A) Appearance of control and 100 µM glyphosate-treated leaf discs 14 days after treatment. (B) Shikimic acid accumulation in the leaf discs one week after treatment. Bars represent mean±SD (n=3). (C) Higher concentration of glyphosate (1 mM) still requires light for phytotoxicity. Photograph was taken 3 days after treatment.

Figure 4:
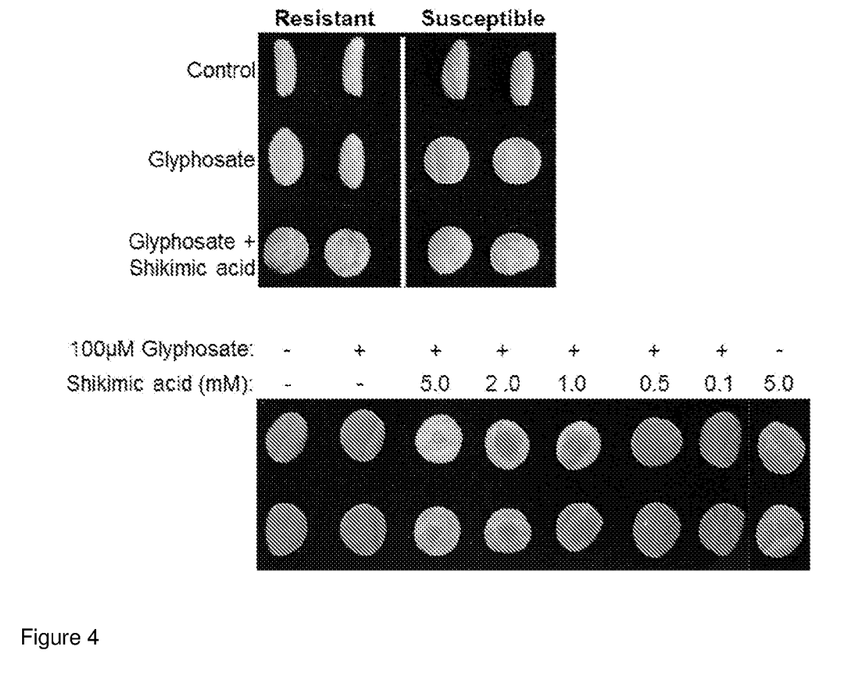
FIG. 4. shows shikimate addition breaks glyphosate resistance.

(A) Leaf discs from glyphosate-resistant and susceptible *C. sumatrensis* plants were treated with 100 µM glyphosate alone or in combination with 5 mM shikimic acid. The photograph was taken 14 days later. Glyphosate resistance was broken down by addition of shikimic acid. (B) Photograph of leaf discs taken 7 days after treatment with the indicated combinations of compounds. Plus (+) denotes presence of compound; minus (−) denotes absence of compound in the treatment. Notably, on its own shikimic acid was not phytotoxic, but activated cell death in the presence of glyphosate.

Figure 5:
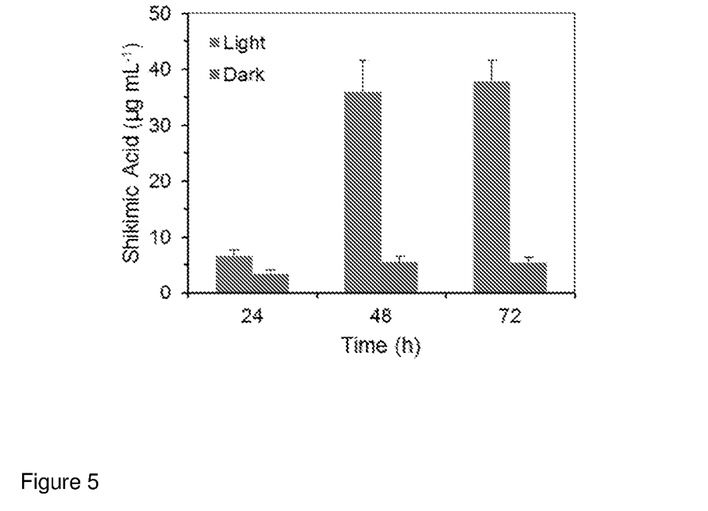
FIG. 5. shows Light stimulates glyphosate-induced accumulation of shikimic acid.

Arabidopsis leaf discs were floated on 25 µM glyphosate and incubated in the light or dark were harvested at the indicated time-points for determination of shikimic acid content. Bars represent mean±SD (n=3).

Figure 6:
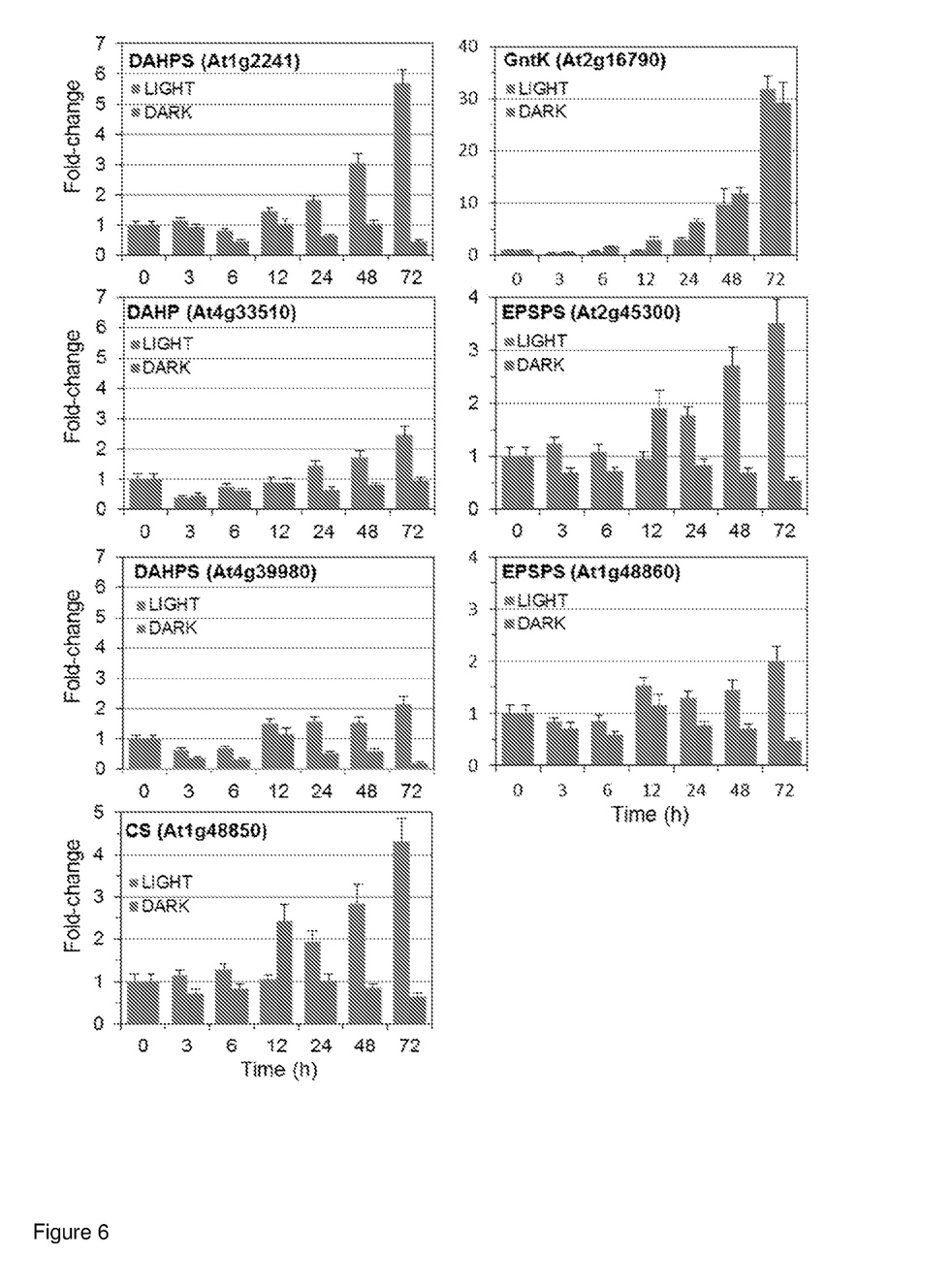
FIG. 6. shows Real-time PCR analysis of selected Arabidopsis genes.

Leaf discs were floated on 50 µM glyphosate in the light or dark and samples for RNA harvested at the indicated times. Bars represent mean±SD (n=3). Gene abbreviations as given in Table 1.

Figure 7:
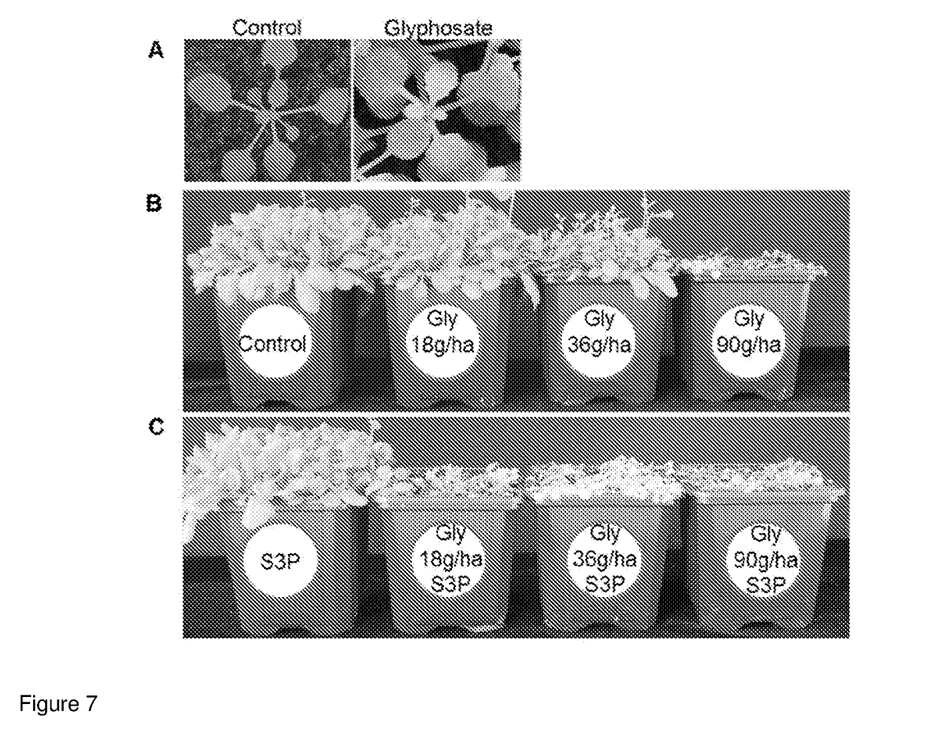
FIG. 7. shows Shikimate-3-phosphate enhances glyphosate toxicity in Arabidopsis.
Figure 8:
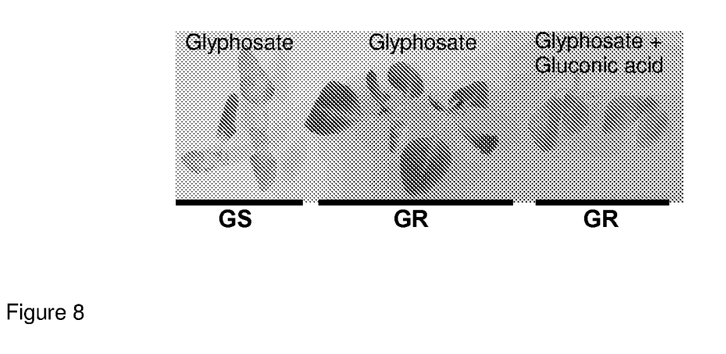
FIG. 8 reveals that gluconic acid breaks glyphosate-resistance in Conyza sumatrensis. Glyphosate-resistant (GR) and susceptible (GS) C. sumatrensis plants were germinated in soil and transferred to solutions of 100 µM glyphosate with or without 5 mM gluconic acid. Ten days after exposure to glyphosate only, the GS plants were stunted and chlorotic, while equivalent GR plants have grown with expanded healthy and green leaves. When gluconic acid was added to the glyphosate, GR plant growth was also retarded and chlorosis symptoms were very distinct. This indicates that gluconic acid makes GR plants sensitive to glyphosate.

(A) Appearance of chlorotic symptoms on the apical meristematic tissues 4 days after exposure to glyphosate. The meristem eventually dies. (B) Response of plants exposed to increasing concentrations of glyphosate. (C) Plant response to shikimate-3-phosphate mixed with indicated amounts of glyphosate. Photographs in (B) and (C) were taken at 3 weeks after spraying. Gly=glyphosate at the indicated rates;
S3P=500 µM shikimate-3-phosphate.

MATERIALS & METHODS

Plant material—Arabidopsis thaliana ecotype Columbia-0 was used in all experiments that utilised Arabidopsis. For spray experiments, many seeds were sown in compost inside pots with a base area of 36 m². The plants were treated with herbicide formulations by spraying when they were 2-3 weeks old. To obtain leaf discs, individual plants were sown in single pots and grown for 4 weeks. Leaf discs of 1-cm diameter were cored from fully expanded leaves. Glyphosate-resistant and susceptible biotypes of Conyza sumatrensis [(Retz.) E. Walker] were obtained from an olive grove in Italy. For spraying experiments, many plants were sown in compost inside pots with a base area of 81 cm². Plants were spray-treated at 2 weeks from sowing. For leaf disc experiments, individual plants were sown in single pots and grown for 8 weeks before coring 1-cm diameter leaf discs from fully expanded leaves. All plants were grown in a 16 h photoperiod (~200 µmol·m$^{-2}$·s$^{-1}$) at 22° C.

Chemicals—Shikimic acid and pure glyphosate were purchased from Sigma-Aldrich (Dorset, UK). These were used to make stock solutions in water that were adjusted to pH 5.5 and used for treatment of leaf discs. Shikimate-3-phosphate trisodium salt was purchased from Santa Cruz Biotechnology (Dallas, Tex.). Gallup® 360 (Barclay Chemicals Manufacturing Ltd, Dublin, Ireland), a formulation of 360 g/L glyphosate, was used for spray treatments after diluting down to the desired rate.

Treatments—Leaf discs of 1 cm-diameter were cored from plants and floated on 10 mL solutions inside Petri dishes. A minimum of 5 replicate discs per treatment arising from 5 independent plants were used. For dark incubation, the Petri dishes were wrapped in aluminium foil to exclude light. Leaf discs were harvested at time-points indicated in the Figure legends for photographing or for shikimic acid analysis. For spray treatments, glyphosate was formulated in 3 mL with enough Gallup® to achieve the desired rate on a surface area of 36 cm² or 81 cm² pots. A commercial herbicide enhancer oil Activator-G™ (Agrigem Ltd., Market Rasen, UK) was added as an adjuvant to spray at a final rate of 1 L/ha. Shikimate-3-phosphate was added to a final concentration of 500 µM in the 3 mL. Control plants were sprayed with water containing Activator-G only. Photographs of sprayed plants were taken and time-points indicated in the Figure legends.

Shikimic acid analysis—Leaf discs floating on treatment solutions were blotted dry, added to microfuge tubes containing 125 µL of 0.25 N HCL before snap-freezing in liquid nitrogen and storing at −20° C. Samples were thawed at room temperature, vortexed for 5 min, and then incubated at 60° C. for 15 min. Aliquots of 25 µL were withdrawn and mixed with 100 µL of 0.25% (w/v) periodic acid/0.25% m-periodate in fresh microfuge tubes. After 30 min incubation at 37° C., 100 µL of 0.6 N NaOH/0.22 M $Na_2SO_3$ were added and the volume made up to 1 mL with distilled water. The shikimic acid in the samples was determined by spectrophotometric measurements at 382 nm against a reagent only blank and using a calibration curve of shikimic acid standards. The shikimic acid accumulating in response to glyphosate treatment was calculated as the difference between the reading from mock-treated control leaf discs and the glyphosate-treated discs. Values were expressed as µg/mL shikimic acid.

Gene expression analysis—RNA was extracted from leaf tissues using the Spectrum Plant Total RNA kit (Sigma-Aldrich) according to the manufacturer's instructions. Each sample was a pool of five 1 cm-diameter leaf discs arising from 5 independent plants. First strand cDNA synthesis was performed using 4 µg total RNA and oligod(T) using Promega (Southampton, UK) GoScript Reverse Transcription System. Quantitative real-time polymerase chain reaction was performed using SensiFast reagent kit (Bioline, London, UK) on a Rotorgene-Q (Qiagen, Crawley, UK). Each 20 µL reaction contained 10 µL SensiFast reagent, 5 µL cDNA template that had been diluted 1:8, and 8 pmoles each primer (forward and reverse primers). Cycling conditions used were as follows: denaturation at 95° C. for 2 mins followed by 40 cycles of 95° C. for 10 sec, annealing at 56° C. for 15 sec, and extension at 72° C. for 25 sec. Data analysis was performed using REST2009 (Qiagen, Crawley, UK) using ACTIN2 (At3g18780) and EIF4 (At3g13920) as reference control genes. The primers used for analysis are given in Table 2. Triplicate samples per treatment per time-point were analysed in order to calculate a mean and standard deviation.

TABLE 1

Primer sequences used for quantitative PCR analysis. Note-abbreviated names correspond to the gene names provided in Table 2.

| AGI | Gene Name | Forward Primer | Reverse Primer |
|---|---|---|---|
| At3g18780 | ACTIN2 | GTGGTCGTACAACCGGTATTG | TCACGTCCAGCAAGGTCAAG |
| At3g13920 | ELF4A | ATGAGAGGATGCTCTGCCTTCG | GCAGAGCAAACACAGCAACAG |
| At1g22410 | DAHPS | ACCACCGTCAACCAAACTTC | TGAAGCAGCTGGTGTTTTG |
| At4g39980 | DAHPS | TCCAGAGTCAGAGAAAATCTG | GCTTGGACGGTGAGAAAGAT |
| At4g33510 | DAHPS | GGAGTCTAGAGAACAAGAA | CAAGCTCATTTAACTTGGCAAC |
| At5g66120 | DHQS | GCCTTTATTGCTCCACCAAC | CCTGGAAAGAGTCGTGGAAG |
| At2g21940 | SK1 | TTTTTGTTTGGAAGCTTGGAG | TTTTCAAAAATTGACAAGATCG |
| At4g39540 | SK2 | CTCCATTTGATGAAGAACAACAG | CGCATTCACGAGGAAACTGTTC |
| At3g26900 | SKL1 | GAGATCTTCTCTGCGTCTGCTTCT | TTGCAGAGAGTAGTTCGAGCT |
| At2g35500 | SKL2 | CTTCTGGTTTGGCTATAATCTTCAAC | ATCCACTGAAAACGCGAGGA |
| At2g16790 | GntK | TCCTGATTACAAACCGGGAA | CTTCCTCGGAAGCTCTCTTCT |
| At2g45300 | EPSPS | TGATAACTCCGCCCAAAAAG | CAGCACAAGCTGCAAGAGAG |
| At1g48860 | EPSPS | GTGCCTCGGATGAGAGAGAG | TTAGCGTTGACACGAACAGG |
| At1g48850 | CS | TGGTGGCTCTAGTTCTTGTGG | GGCTGCTCTATCTGGAGAGG |

While studying programmed cell death, we noted that light is a crucial factor in the activation of plant cell death (Chivasa et al., 2009; Wang et al., 2012; Smith et al., 2014). We wondered if deprivation of light could also block glyphosate toxicity. To investigate this, we used a previously published in vitro assay (Teaster and Hoagland, 2013) in which leaf discs are floated over glyphosate solutions of desired concentration. We found that tissues incubated in complete darkness are protected from the phytotoxic effects of glyphosate (FIG. 2A). This result demonstrated that light is required for activation of cell death after exposure to glyphosate. When we used much higher concentrations of glyphosate than what is usually used for similar experiments, we found that dark-incubation suppressed the phytotoxic effects (FIG. 2C), demonstrating that light is a powerful factor controlling plant responses to glyphosate.

Inhibition of EPSPS depletes the pool of aromatic amino acids and glyphosate application is attended by a build-up of shikimate (Amrhein et al., 1980; Herman, 1995). Accordingly, a surge in shikimic acid after application of glyphosate is routinely used as a biochemical marker for glyphosate sensitivity, while suppression of the shikimic acid response indicates glyphosate resistance (e.g., Kaundun et al., 2014). We measured the level of shikimic acid accumulation in the glyphosate-treated leaf tissues prior to cell death. As expected, there was a massive rise of shikimic acid concentration in tissues incubated in the light-dark cycle (FIG. 2B). However, continuous dark incubation suppressed shikimic acid accumulation (FIG. 2B), which correlates with the absence of cell death in these tissues (FIG. 2A,C). Suppression of glyphosate-induced shikimic acid accumulation by dark incubation has previously been reported in a number of plant species (Amrhein et al., 1980; Tokhver and Pal'm, 1986; Shaner et al., 2005).

The shikimic acid accumulation results can be accounted for by at least two possibilities; (i) that in darkness glyphosate fails to block the shikimate pathway or (ii) that flux through the shikimate pathway is far much lower in darkness than in light. Since glyphosate is a substrate (phosphoenolpyruvate) mimic and a competitive inhibitor of EPSPS (Boocock and Coggins, 1983), the existence of EPSPS post-translational modification(s) that reduce its affinity for glyphosate while maintaining substrate affinity is inconceivable. This makes the first point highly improbable. However, shutdown of the shikimate pathway in the dark is a more likely explanation for at least three reasons. First, a number of the shikimate pathway genes are differentially expressed between darkness and light (Henstrand et al., 1992; Reinbothe et al., 1994) and there is evidence that light also stimulates enzyme activity (Weaver and Herrmann, 1994). Accordingly, the enzyme catalysing the shikimate pathway commitment step (3-deoxy-D-arabino-heptulosonate 7-phosphate synthase) is stimulated by light via the chloroplast ferredoxin/thioredoxin system (Entus et al., 2002). Second, there is also evidence suggesting reduced flux through the shikimate pathway in the dark in comparison to flux through the pathway in light. Phenylalanine is synthesised from chorismate, the metabolite at which the shikimate pathway branches. Inhibition of phenylalanine ammonialyase (PAL), which catalyses conversion of phenylalanine to cinnamic acid, results in accumulation of phenylalanine—a proxy for shikimate pathway flux. Buckwheat PAL inhibition using L-α-aminooxy-β-phenylpropionic acid is attended by three-fold higher phenylalanine accumulation in light than in the dark (Holländer et al., 1979). Third, a previous study demonstrated that light directly stimulates production of shikimic acid (Amrhein et al., 1980). Therefore, the reduced flux of the shikimate pathway in the dark most probably accounts for the low shikimic acid accumulation in dark-incubated glyphosate-treated tissues.

Because no tissue death occurs in response to glyphosate under dark conditions, we propose that cell death requires light-dependent factors activated by glyphosate. In support of this hypothesis, a recent study revealed that *Arabidopsis* mutants lacking a functional copy of the major red and far-red light receptor PHYB are resistant to glyphosate (Sharkhuu et al., 2014). Thus, impairment of light perception and signalling can block glyphosate toxicity. In weeds, shikimic acid and shikimate-3-phosphate are major metabolites accumulating in glyphosate-susceptible biotypes but greatly suppressed in glyphosate-resistant biotypes. Identification of metabolites accumulating to disproportionately higher levels in light than dark after glyphosate treatment could provide useful clues required to overcome glyphosate resistance in weeds. In the first instance, we decided to investigate if shikimic acid might play an essential role in modulating glyphosate-induced toxicity.

Figure 3:
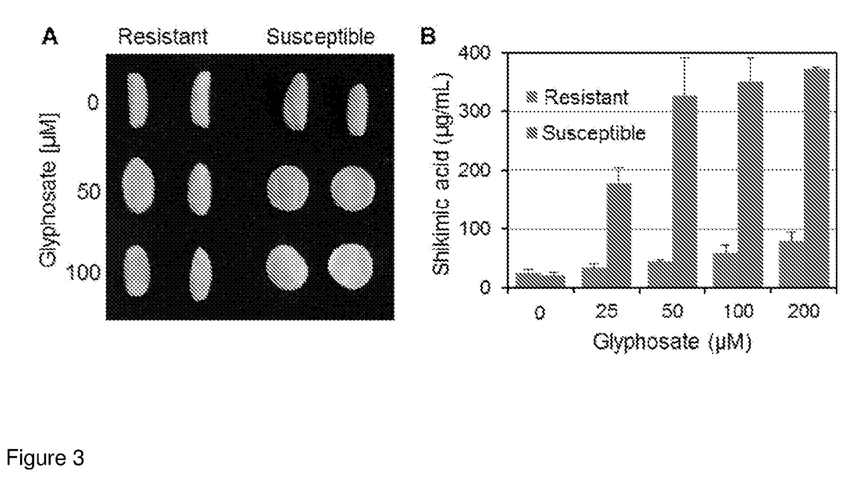
FIG. 3. shows response of glyphosate-resistant and susceptible *C. sumatrensis* biotypes. Leaf discs from glyphosate-resistant and susceptible biotypes of *Conyza sumatrensis* were floated on the indicated solutions. (A) Appearance of the discs was photographed 14 days after treatment. (B) Shikimic acid accumulation in the discs was measured at one week after treatment. Bars represent mean±SD (n=3). Glyphosate activates shikimate accumulation and cell death in the susceptible, but not resistant biotype.

We obtained susceptible and glyphosate-resistant biotypes of *Conyza sumatrensis* from an olive grove in southern Italy. The response to glyphosate in these biotypes can be demonstrated in vitro at glyphosate concentrations in the range 25-200 μM (FIG. 3A). As expected, the susceptible biotype accumulated significantly higher levels of shikimic acid than the resistant biotype (FIG. 3B). This demonstrated that the in vitro assay employed in this study reflects what happens under field conditions. Within 3 days of exposure to glyphosate, the maximum concentration of shikimic acid accumulating in the susceptible *C. sumatrensis* was in the range of 10-15 mM. A previous study estimated cellular shikimic acid to reach 20-23 mM in glyphosate-treated *Galium mollugo* cells (Amrhein et al., 1980). Thus, we could use concentrations within this range to investigate the possibility of using exogenous shikimic acid to control glyphosate-resistant weeds.

We treated resistant and susceptible *C. sumatrensis* with shikimic acid premixed with glyphosate. Whereas 100 μM glyphosate on its own did not affect the viability of the resistant biotype, addition of 5 mM shikimic acid to glyphosate dramatically broke down this herbicide resistance (FIG. 4A). When leaf discs of the susceptible biotype are floated on glyphosate, there is a very gradual onset of cell death preceded by chlorosis and then browning of the tissues easily visible between 10-14 days later. However, discs of the resistant biotype treated with glyphosate+shikimic acid had extensive cell death within 5 days of treatment. This clearly shows that incorporating shikimic acid as an additive to glyphosate formulations bypasses the genetic mechanisms evolved in the weeds. Importantly, shikimic acid on its own did not cause any phytotoxicity, even when we increased it to 15 mM, the physiological concentration we found accumulating in the susceptible biotype after exposure to glyphosate. There was a dose-dependent effect of shikimic acid, concentrations in the range of 1-5 mM being able to break glyphosate resistance within 7 days of application and lower concentrations being unable to (FIG. 4B). These results demonstrate that shikimate pathway intermediates (at least shikimic acid) can be used as a viable option for breaking glyphosate resistance in weeds.

How does shikimic acid enhance glyphosate phytotoxicity and what are the implications? Shikimic acid is an intermediate metabolite of the shikimate pathway, which provides precursors to major secondary metabolic pathways. When EPSPS is inhibited by glyphosate, shikimic acid can still be converted to shikimate-3-phosphate. Curiously, more shikimic acid than shikimate-3-phosphate accumulates in glyphosate-treated tissues and it has been proposed to be a reflection of reaction equilibrium unfavourable for shikimate-3-phosphate accumulation (Amrhein et al., 1980). Further investigation of this puzzling observation could provide important clues to how glyphosate causes phytotoxicity. Therefore, we explored this using *Arabidopsis* and examining the response of all its genes for the shikimate pathway enzymes. We identified a total of 13 shikimate pathway genes in the *Arabidopsis* genome (Table 1).

TABLE 2

*Arabidopsis* putative shikimate pathway genes identified using BLAST searches

| Enzyme | Genes | Gene ID |
| --- | --- | --- |
| 3-Deoxy-D-arabinoheptulosonate-7-phosphate synthase (DAHPS) | 3 | At1g22410 |
|  |  | At4g39980 |
|  |  | At4g33510 |
| 3-Dehydroquinate synthase (DHQS) | 1 | At5g66120 |
| 3-Dehydroxyquinate dehydratase/shikimate dehydrogenase (DHQ-SDH) | 1 | At3g06350 |
| Shikimate kinase (SK) | 5 | At2g21940 |
|  |  | At4g39540 |
|  |  | At3g26900 |
|  |  | At2g35500 |
|  |  | At2g16790 |
| 5-Enoylpyruvyl shikimate-3-phosphate synthase (EPSPS) | 2 | At2g45300 |
|  |  | At1g48860 |
| Chorismate synthase (CS) | 1 | At1g48850 |

*Arabidopsis* leaf discs were floated on 25 μM glyphosate solutions and incubated in light or total darkness. Samples were harvested at various intervals within 72 h of treatment for quantification of shikimic acid and analysis of gene expression using quantitative real-time PCR. There was a significant accumulation of shikimic acid in response to glyphosate when the plant tissues were incubated in light (FIG. 5). Dark incubation suppressed shikimic acid accumulation (FIG. 5). In light, glyphosate-induced significant changes in the expression of genes encoding enzymes for the commitment step of the shikimate pathway (DAHPS), shikimate kinase (SK), the glyphosate target protein 5-enoylpyruvyl shikimate-3-phosphate synthase (EPSPS), and chorismate synthase (CS). All three DAPS genes were differentially regulated, only one of the five putative SK genes responded to glyphosate, both EPSPS genes were responsive, and the chorismate synthase (CS) genes responded as well (FIG. 6). Up-regulation of the shikimate pathway components triggered by blockading flux with glyphosate is a typical metabolic response.

However, we were surprised that the biggest change in gene expression occurred in the putative shikimate kinase gene (At2g16790), which was over 30-fold while all other genes were below 6-fold (FIG. 6). What is more striking is that, while dark incubation suppressed glyphosate-induced stimulation of other genes, At2g16790 was also stimulated in the dark (FIG. 6). This suggests this gene is not stimulated by a build-up of shikimate pathway intermediates, but most likely by the presence of glyphosate. The fact that At2g16790 is the most responsive gene and yet shikimate-3-phosphate accumulation does not surpass shikimic acid is puzzling. Although BLAST searches had identified this gene as having high homology to *Arabidopsis* shikimate kinases, this result indicated that the protein may not possess shikimate kinase activity. Of the five *Arabidopsis* "SK" genes we identified, recombinant proteins from two genes (At2g2140 and At4g39540) have experimentally verified shikimate kinase activity, with no enzyme activity detectable in recombinant proteins from the other two genes (At3g26900 and At2g35500) (Fucile et al., 2008). The latter two have been named AtSK LIKE1 (AtSKL1) and AtSKL2, respectively. Whereas AtSK1, AtSK2, AtSKL1, and AtSKL2 proteins have a chloroplast-targeting sequence, At2g16790 does not have a distinctive chloroplast-targeting peptide and is likely to have a different cellular location, though this will require experimental verification.

Amino acid residues of bacterial shikimate kinase enzymes involved in binding shikimate, ATP or ATP analogues, and $Mg^{2+}$ have been identified and they are all conserved in the AtSK1 and AtSK2 sequences (Fucile et al., 2008). In the protein sequence of At2g16790, 11 out of 16 of these residues are conserved, with the entire ATP-binding P-loop intact, as are residues for binding $Mg^{2+}$ ions. Some of the shikimate-binding residues are missing, notably the conserved RPLL consensus sequence (Gu et al., 2002; Leippe et al., 2003) of which the arginine has been proposed to play a critical role in phosphotransfer from ATP to shikimate (Cheng et al., 2005). Therefore, At2g16790 potentially binds ATP, $Mg^{2+}$ and shikimate, but it most probably has no shikimate kinase activity. In fact, At2g16790 has been classified as a gluconate kinase (GntK; EC 2.7.1.12), which functions in the pentose phosphate pathway (Fucile et al., 2008). Erythrose-4-phosphate, one of two substrates for the first shikimate pathway reaction, comes from the pentose phosphate pathway. Activation of its gene after exposure to glyphosate in both light and dark conditions highlights the possibility that pentose phosphate pathway intermediates could also build up in the presence of glyphosate and possibly be siphoned away to produce as yet uncharacterised metabolites that may account for glyphosate toxicity. This lends further support to the strategy of spiking glyphosate formulations with appropriate upstream intermediate metabolites as a way to break glyphosate resistance.

Next we turned our attention to the inexplicable retardation of shikimate conversion to shikimate-3-phosphate during exposure to glyphosate. We proposed the hypothesis that shikimate-3-phosphate is a critical component required for glyphosate to be phytotoxic and that glyphosate-susceptible plants attempt to block its formation in order to avoid death. We sprayed 2-week-old *Arabidopsis* plants with a formulation of glyphosate at different rates with or without shikimate-3-phosphate as an additive. Foliar application of glyphosate by spraying causes chlorosis and then cell death of apical meristems. Within three days of application the newly emerging leaves appear yellow, and this spreads to older leaves, depending on the amount of glyphosate applied (FIG. 7A). This immediately stops growth of the plant, though much older lower leaves may remain green for some time before the whole plant dies. We chose glyphosate rates (18-90 g/ha) ranging from concentrations that do not perturb plant growth to concentrations that are phytotoxic. Glyphosate at 18 g/ha had no effects on plant growth, while 36 g/ha had very modest effects on *Arabidopsis* (FIG. 7B). However, inclusion of shikimate-3-phosphate in these glyphosate rates transformed the formulations to a lethal herbicidal cocktail that stopped *Arabidopsis* growth (FIG. 7C). Shikimate-3-phosphate on its own did not have any adverse effects on *Arabidopsis* (FIG. 7C). This clearly demonstrates that the potency of glyphosate can be greatly enhanced by shikimate-3-phosphate.

Because the pentose phosphate pathway gene GntK responds to glyphosate, we tested if intermediates in the pathway might also influence glyphosate toxicity (FIG. 8). Glyphosate resistant (GR) and glyphosate susceptible (GS) *Conyza sumatrensis* were germinated in soil and the shoots cut off at the base of the stem and placed in 2 mL of 100 μM glyphosate with or without gluconic acid at various concentrations. As expected, glyphosate-treated GS plants stopped growing and developed chlorosis, which eventually led to tissue death. GR plants in glyphosate remained healthy and green, even growing and developing new leaves within the petri-dish compartments. However, when glyphosate was mixed with gluconic acid, GR plants ceased growth and also developed chlorosis and eventual tissue death. Cessation of growth and development of chlorosis are key hallmarks of glyphosate toxicity. These results show that intermediates of pathways upstream of the shikimate pathway can also be used to break glyphosate resistance.

Overall, we propose that augmenting cellular levels of gluconic acid, shikimic acid, or shikimate-3-phosphate via inclusion in glyphosate formulations will have at least two desired effects. First, it increases the potency of glyphosate, leading to the reduction of a synthetic chemical in the food chain and replacing it with a naturally occurring plant metabolite. This could enhance food quality and address environmental concerns of synthetic agrochemical residues in the soil. Second, glyphosate-resistant plants normally avoid accumulation of these intermediates, but introduction of these metabolites through sprays in composite mixture with glyphosate breaks down their resistance. While the exact mechanism of this is still unclear, we speculate that perhaps metabolic processing of these intermediates by as yet unknown pathways could produce lethal products leading to growth inhibition and cell death. In susceptible plants, shikimate-3-phosphate may also enhance glyphosate potency by directly making more EPSPS enzyme molecules available for inhibition by glyphosate. This is because glyphosate only binds to an EPSPS:Shikimate-3-phosphate complex (Boocock and Coggins, 1983).

REFERENCES

1. Amrhein N, Deus B, Gehrke P, Steinrüchen H C. (1980). The Site of the Inhibition of the Shikimate Pathway by Glyphosate. II. Interference of Glyphosate with Chorismate Formation in vivo and in vitro. Plant Physiol 66, 830-834.
2. Boocock M R, Coggins J R. (1983). Kinetics of 5-enolpyruvylshikimate-3-phosphate synthase inhibition by glyphosate. FEBS Lett 154, 127-133.
3. Cheng W, Chang Y, Wang W. (2005). Structural basis for shikimate-binding specificity of Helicobacter pylori shikimate kinase. J Bacteriol 187, 8156-8163.
4. Chivasa S, Murphy A M, Hamilton J M, Lindsey K, Carr J P, Slabas A R. (2009). Extracellular ATP is a regulator of pathogen defence in plants. Plant J 60, 436-448.
5. Entus R, Poling M, Herrmann K M. (2002). Redox regulation of *Arabidopsis* 3-deoxy-D-arabino-heptulosonate 7-phosphate synthase. Plant Physiol 129, 1866-1871.
6. Fucile G, Falconer S, Christendat D. (2008). Evolutionary diversification of plant shikimate kinase gene duplicates. PLoS Genet 4, e1000292.
7. Gaines T A, Zhang W, Wang D, Bukun B, Chisholm S T, Shaner D L, Nissen S J, Patzoldt W L, Tranel P J, Culpepper A S, et al. (2010). Gene amplification confers glyphosate resistance in Amaranthus palmeri. Proc Natl Acad Sci USA 107, 1029-1034.
8. Ge X, d'Avignon D A, Ackerman J J H, Sammons R D. (2010). Rapid vacuolar sequestration: the horseweed glyphosate resistance mechanism. Pest Manag. Sci. 66, 345-348.
9. Gu Y, Reshetnikova L, Li Y, Wu Y, Yan H, et al. (2002). Crystal structure of shikimate kinase from Mycobacterium tuberculosis reveals the dynamic role of the LID domain in catalysis. J Mol Biol 319, 779-89.

10. Heap I. (2015). International Survey of Herbicide Resistant Weeds. Online. www.weedscience.com (Jan. 25, 2015).
11. Henstrand J M, McCue K F, Brink K, Handa A K, Herrmann K M, Conn E E. (1992). Light and fungal elicitor induce 3-deoxy-D-arabino-heptulosonate 7-phosphate synthase mRNA in suspension cultured cells of parsley (*Petroselinum crispum* L.). Plant Physiol. 98, 761-763
12. Herrmann K M. (1995). The Shikimate Pathway as an Entry to Aromatic Secondary Metabolism. Plant Physiol 107, 7-12.
13. Holländer H, Kiltz H H, Amrhein N. (1979). Interference of L-α-amino-oxy-β-phenylpropionic acid with phenylalanine metabolism in buckwheat. Z Naturforschung 34C, 1162-1173.
14. Kaundun S S, Dale R P, Zelaya I A, Dinelli G, Marotti I, McIndoe E, Cairns A. (2011). A novel P106L mutation in EPSPS and an unknown mechanism(s) act additively to confer resistance to glyphosate in a South African *Lolium rigidum* population. J Agric Food Chem 59, 3227-3233.
15. Kaundun S S, Hutchings S-J, Harris S C, Jackson L V, Shashi-Kiran R, Dale R P, McIndoe E. (2014). A simple in-season bioassay for detecting glyphosate resistance in grass and broadleaf weeds prior to herbicide application in the field. Weed Science 62, 597-607.
16. Leipe D D, Koonin E V, Aravind L. (2003). Evolution and classification of P-loop kinases and related proteins. J Mol Biol 333, 781-815.
17. Lorraine-Colwill D F, Powles S B, Hawkes T R, Hollinshead P H, Warner S A J, Preston C. (2002). Investigations into the mechanism of glyphosate resistance in *Lolium rigidum*. Pestic Biochem Physiol 74, 62-72.
18. Nature Editorial (2014). A growing problem. Nature 510, 187.
19. Ng C, Wickneswary R, Salmijah S, Teng Y T, Ismail B S. (2004). Glyphosate resistance in *Eleusine indica* (L.) Gaertn. from different origins and polymerase chain reaction amplification of specific alleles. Aust J Agric Res 55, 407-414.
20. Owen M D K, Zelaya I A. (2005). Herbicide-resistant crops and weed resistance to herbicides. Pest Manag Sci 61, 301-311.
21. Reinbothe C, Ortel B, Parthier B, Reinbothe S. (1994). Cytosolic and plastid forms of 5-enolpyruvylshikimate-3-phosphate synthase in *Euglena gracilis* are differentially expressed during light-induced chloroplast development. Mol. Gen. Genet. 245, 616-622.
22. Sammons R D, Gaines T A. (2014). Glyphosate resistance: state of knowledge. Pest Manag Sci 70, 1367-1377.
23. Shaner D L, Nadler-Hassar T, Henry W B, Koger C H. (2005). A rapid in vivo shikimate accumulation assay with excised leaf discs. Weed Science 53, 769-774.
24. Sharkhuu A, Narasimhan M L, Merzaban J S, Bressan R A, Weller S, Gehring C. (2014). A red and far-red light receptor mutation confers resistance to the herbicide glyphosate. Plant J78, 916-26.
25. Smith S J, Wang Y, Slabas A R, Chivasa S. (2014). Light regulation of cadmium-induced cell death in *Arabidopsis*. Plant Signal Behav. 9, e27578.
26. Steinrücken H C, Amrhein N. (1980). The herbicide glyphosate is a potent inhibitor of 5-enolpyruvylshikimic acid-3-phosphate synthase. Biochem Biophys Res Commun 94, 1207-1212.
27. Teaster N D, Hoagland R E. (2013). Varying tolerance to glyphosate in a population of Palmer amaranth with low EPSPS gene copy number. American J Plant Sci 4, 2400-2408.
28. Tokhver A K, Pal'm E V. (1986). Light-dependence of the inhibiting action of glyphosate on the shikimate pathway in cotyledon leaves of buckwheat seedlings. Soviet Plant Physiol. 33, 748-753.
29. Transparency Market Research (2014). Glyphosate market for genetically modified and conventional crops— global industry analysis, size, share, growth, trends and forecast 2013-2019. http://www.transparencymarketresearch.com/glyphosate-market.html
30. Waltz E. (2010). Glyphosate resistance threatens Roundup hegemony. Nature Biotechnology 28, 537-538.
31. Wang Y, Slabas A R, Chivasa S. (2012). Proteomic analysis of dark response in *Arabidopsis* cell suspension cultures. J Plant Physiol. 169, 1690-7.
32. Weaver L M, Herrmann K M. (1994). Dynamics of the shikimate pathway in plants. Trends Plant Sci. 9, 346-351.
33. Yu Q, Jalaludin A, Han H, Chen M, Sammons R D, Powles P B. (2015). Evolution of a double amino acid substitution in the 5-enolpyruvylshikimate-3-phosphate synthase in *Eleusine indica* conferring high-level glyphosate resistance. Plant Physiol 167, 1440-1447.

The invention claimed is:

1. An herbicidal composition comprising 5 grams acid equivalent per liter to 600 grams acid equivalent per liter glyphosate or a suitable salt or salts thereof and at least one compound selected from the group consisting of shikimate 3-phosphate, shikimate (or shikimic acid), 3-dehydroquinate, and 3-deoxy-D-arabino-heptulosonate 7-phosphate (DAHP).

2. The herbicidal composition according to claim 1, wherein the compound is shikimate 3-phosphate.

3. The herbicidal composition according to claim 1, further comprising one or more agriculturally acceptable additives.

4. The herbicidal composition according to claim 3 further comprising an adjuvant selected from the group consisting of a surfactant and ammonium sulphate.

5. The herbicidal composition according to claim 1, further comprising one or more additional herbicidal agents.

6. The herbicidal composition according to claim 1, which is in a concentrated or tank mix form.

7. A method for controlling weeds or vegetation by applying the herbicidal composition of claim 1 to weeds or vegetation.

8. A method for controlling weeds or vegetation by applying a post-emergence herbicidal spray composition or tank mixture according to claim 6 to weeds or vegetation.

9. The method according to claim 8 wherein the weeds or vegetation have become resistant to glyphosate.

10. The method according to claim 8 wherein the amount of glyphosate which is required to control the weeds or vegetation is at least 10% less glyphosate than would be required to control the weeds or vegetation in the absence of the shikimate, or upstream pathway metabolite.

11. The method according to claim 10 wherein the amount of glyphosate which is required to control the weeds or vegetation is at least 60% less glyphosate than would be required to control the weeds or vegetation in the absence of the shikimate, or upstream pathway metabolite.

* * * * *